(12) United States Patent
Nandiwada et al.

(10) Patent No.: US 7,610,551 B2
(45) Date of Patent: Oct. 27, 2009

(54) SYSTEM AND METHOD FOR MANAGING DISTRIBUTION OF MULTI-FORMATTED CONTENT

(75) Inventors: Srinivasarao Nandiwada, Natick, MA (US); Eswar Priyadarshan, West Roxbury, MA (US); Krishnamoorthy Dhandapani, Pallakkad (IN); George Bukow, West Newbury, MA (US); Kenneth Lo, Quincy, MA (US)

(73) Assignee: VeriSign, Inc., Mountain View, CA (US)

( * ) Notice: Subject to any disclaimer, the term of this patent is extended or adjusted under 35 U.S.C. 154(b) by 0 days.

(21) Appl. No.: 11/710,480

(22) Filed: Feb. 26, 2007
(Under 37 CFR 1.47)

(65) Prior Publication Data

US 2008/0147674 A1 Jun. 19, 2008

Related U.S. Application Data

(60) Provisional application No. 60/776,967, filed on Feb. 24, 2006.

(51) Int. Cl.
*G06F 17/00* (2006.01)

(52) U.S. Cl. ...................... 715/249; 715/239

(58) Field of Classification Search .............. 715/239, 715/249, 273
See application file for complete search history.

(56) References Cited

U.S. PATENT DOCUMENTS

| | | | |
|---|---|---|---|
| 5,309,257 A | 5/1994 | Bonino et al. |
| 5,347,600 A | 9/1994 | Barnsley et al. |
| 5,548,789 A | 8/1996 | Nakanura |
| 5,613,017 A | 3/1997 | Rao et al. |
| 5,781,901 A | 7/1998 | Kuzma |
| 5,826,023 A | 10/1998 | Hall et al. |

(Continued)

FOREIGN PATENT DOCUMENTS

DE 19934787 A1 2/2001

(Continued)

OTHER PUBLICATIONS

USA Today, "SportsML Computer Language Streamlines Sports Scores", posted Nov. 7, 2002, downloaded from the Internet: http://www.usatoday.com/tech/news/techinnovations/2002-11-07-sports-ml_x.htm, pp. 1-2.*

(Continued)

*Primary Examiner*—Laurie Ries
(74) *Attorney, Agent, or Firm*—Blakely, Sokoloff, Taylor & Zafman, LLP; Judith A. Szepesi (57) ABSTRACT

A system and method for managing distribution of multi-formatted content. According to an embodiment, a content aggregation platform provides a user interface to receive a location of content to be provided to the content aggregation platform by a content provider in a source format native to the content provider, and transformation instructions describing how to transform the source format of the content into a platform format native to the content aggregation platform, receives the content location and the transformation instructions via the user interface, and stores the content location and the transformation instructions in a database to support subsequent delivery of the content to one or more users for display.

22 Claims, 5 Drawing Sheets

U.S. PATENT DOCUMENTS

| | | | |
|---|---|---|---|
| 5,860,074 | A | 1/1999 | Rowe et al. |
| 5,883,640 | A | 3/1999 | Hsieh et al. |
| 5,896,502 | A | 4/1999 | Shieh et al. |
| 5,903,723 | A | 5/1999 | Beck et al. |
| 5,917,965 | A | 6/1999 | Cahill et al. |
| 5,956,044 | A | 9/1999 | Giorgianni et al. |
| 6,016,520 | A | 1/2000 | Facq et al. |
| 6,072,598 | A | 6/2000 | Tso |
| 6,072,902 | A | 6/2000 | Myers |
| 6,081,883 | A | 6/2000 | Popelka et al. |
| 6,101,320 | A | 8/2000 | Schuetze et al. |
| 6,125,201 | A | 9/2000 | Zador |
| 6,141,686 | A | 10/2000 | Jackowski et al. |
| 6,161,140 | A | 12/2000 | Moriya |
| 6,167,441 | A | 12/2000 | Himmel |
| 6,195,696 | B1 | 2/2001 | Baber et al. |
| 6,198,941 | B1 | 3/2001 | Aho et al. |
| 6,202,097 | B1 | 3/2001 | Foster et al. |
| 6,256,666 | B1 | 7/2001 | Singhal |
| 6,275,869 | B1 | 8/2001 | Sieffert et al. |
| 6,278,449 | B1 | 8/2001 | Sugiarto et al. |
| 6,289,375 | B1 | 9/2001 | Knight et al. |
| 6,300,947 | B1 | 10/2001 | Kanevsky |
| 6,311,215 | B1 | 10/2001 | Bakshi et al. |
| 6,330,068 | B1 | 12/2001 | Matsuyama |
| 6,330,073 | B1 | 12/2001 | Sciatto |
| 6,334,126 | B1 | 12/2001 | Nagatomo et al. |
| 6,341,316 | B1 | 1/2002 | Kloba et al. |
| 6,351,547 | B1 | 2/2002 | Johnson et al. |
| 6,351,568 | B1 | 2/2002 | Andrew |
| 6,360,252 | B1 | 3/2002 | Rudy et al. |
| 6,385,772 | B1 | 5/2002 | Courtney |
| 6,389,460 | B1 | 5/2002 | Stewart et al. |
| 6,411,685 | B1 | 6/2002 | O'Neal |
| 6,421,733 | B1 | 7/2002 | Tso et al. |
| 6,438,576 | B1 | 8/2002 | Huang et al. |
| 6,441,913 | B1 | 8/2002 | Anabuki et al. |
| 6,449,658 | B1 | 9/2002 | Lafe et al. |
| 6,457,044 | B1 | 9/2002 | Iwazaki |
| 6,473,794 | B1 | 10/2002 | Guheen et al. |
| 6,480,853 | B1 | 11/2002 | Jain |
| 6,490,675 | B1 | 12/2002 | Sugiura |
| 6,493,758 | B1 | 12/2002 | McLain |
| 6,505,236 | B1 | 1/2003 | Pollack |
| 6,509,910 | B1 | 1/2003 | Agarwal et al. |
| 6,592,629 | B1 | 7/2003 | Cullen et al. |
| 6,598,076 | B1 | 7/2003 | Chang et al. |
| 6,724,721 | B1 | 4/2004 | Cheriton |
| 6,734,994 | B2 | 5/2004 | Omori |
| 6,742,043 | B1 | 5/2004 | Moussa et al. |
| 6,779,042 | B1 | 8/2004 | Kloba et al. |
| 6,925,595 | B1 | 8/2005 | Whitledge et al. |
| 7,054,905 | B1 | 5/2006 | Hanna et al. |
| 7,310,612 | B2* | 12/2007 | McQueen et al. .............. 705/26 |
| 2001/0049648 | A1 | 12/2001 | Naylor et al. |
| 2001/0054075 | A1 | 12/2001 | Miyanaga |
| 2002/0016818 | A1 | 2/2002 | Kirani et al. |
| 2002/0116531 | A1 | 8/2002 | Chu |
| 2002/0120693 | A1 | 8/2002 | Rudd et al. |
| 2002/0151283 | A1 | 10/2002 | Pallakoff |
| 2002/0169823 | A1 | 11/2002 | Coulombe et al. |
| 2003/0028563 | A1* | 2/2003 | Stutz et al. .................. 707/513 |
| 2003/0093565 | A1 | 5/2003 | Berger et al. |
| 2003/0115277 | A1 | 6/2003 | Watanabe et al. |
| 2003/0126136 | A1* | 7/2003 | Omoigui ...................... 707/10 |
| 2003/0188039 | A1* | 10/2003 | Liu et al. ..................... 709/315 |
| 2004/0078304 | A1 | 4/2004 | Gabbard et al. |
| 2004/0117731 | A1* | 6/2004 | Blyashov ..................... 715/507 |
| 2004/0162818 | A1 | 8/2004 | Shaw |
| 2004/0258063 | A1 | 12/2004 | Raith et al. |
| 2005/0193341 | A1* | 9/2005 | Hayward et al. ............. 715/716 |
| 2006/0053227 | A1* | 3/2006 | Ye et al. ...................... 709/230 |
| 2006/0190616 | A1* | 8/2006 | Mayerhofer et al. ......... 709/231 |

FOREIGN PATENT DOCUMENTS

| | | | |
|---|---|---|---|
| DE | 10050172 | A1 | 4/2001 |
| EP | 0763643 | A2 | 3/1997 |
| EP | 811939 | A2 | 12/1997 |
| EP | 0950969 | A2 | 10/1999 |
| EP | 0992922 | A2 | 4/2000 |
| EP | 1109371 | A2 | 6/2001 |
| EP | 1109372 | A2 | 6/2001 |
| WO | WO 9749252 | A2 | 12/1997 |
| WO | WO 9843177 | A1 | 10/1998 |
| WO | WO 99/60793 | A1 | 11/1999 |
| WO | PCT/GB00/01962 | A1 | 11/2000 |
| WO | WO 00/75859 | A1 | 12/2000 |
| WO | PCT/SE00/00807 | A1 | 1/2001 |
| WO | PCT/KR01/01323 | A1 | 2/2002 |

OTHER PUBLICATIONS

IPTC, "NewsML 1.2 Guidelines v 1.00", downloaded from the Internet: http://www.newsml.org/IPTC/NewsML/1.2/documentation/NewsML_1.2-doc-Guidelines_1.00.pdf, pp. 1-97.*

Internet Standard IETF RFC Document 2616—Hypertext Transfer Protocol, Section 12—Content Negotiation and Section 14-Accept, Section 14.43—User Agent, 1999.

International Application No. PCT/US2007/04869, The International Preliminary Report and the Written Opinion, 10 pages.

The International Application No. PCT/US07/04898, International Preliminary Report and the Written Opinion, 12 pages.

Reynolds, Franklin, et al., "Composite Capability/Preference Profiles (CC/PP): A user side framework for content negotiation," Jul. 27, 1999, pp. 2-10. (www.w3.org/TR/NOTE-CCPP).

Joshi, Anupam, "On Disconnected Browsing of Distributed Information," Seventh International Workshop on Research Issues in Data Engineering, 1997 Proceedings, Birmingham, UK, Apr. 7-8, 1997, IEEE, pp. 101-107.

International Search Report, May 11, 2001, for International Application No. PCT/IS01/06415.

* cited by examiner

SYSTEM AND METHOD FOR MANAGING DISTRIBUTION OF MULTI-FORMATTED CONTENT

CROSS REFERENCE TO RELATED APPLICATIONS

This application claims the benefit under 35 U.S.C. § 119(e) of U.S. Provisional Application No. 60/776,967, filed Feb. 24, 2006, which is hereby incorporated by reference in its entirety.

BACKGROUND OF THE INVENTION

It is well understood that a computing device can only display content that is of a format recognizable by the device's display software. It is the responsibility of the content provider to ensure that any content that it delivers over a network to a user's computing device is formatted appropriately for display on that particular user's device, or else the device will be unable to render the content correctly, if at all.

Taking into account the ever-increasing types of available content (e.g., web pages, feeds, videos, music, programs, etc.), in addition to the various types of computing devices that display content (e.g., PCs, mobile phones, handheld computing devices, etc.), this responsibility of providing multi-formatted content becomes a great burden to many content providers.

Accordingly, there is a need in the art for a system and method to provide displayable content to users in a less burdensome fashion.

DETAILED DESCRIPTION

The present invention reduces the content provider's burden of providing multi-formatted content by introducing a content distribution system that accepts content in its native format from a content provider, and makes any necessary transformations to the content's format so that the system can deliver displayable content to users.

Figure 1:
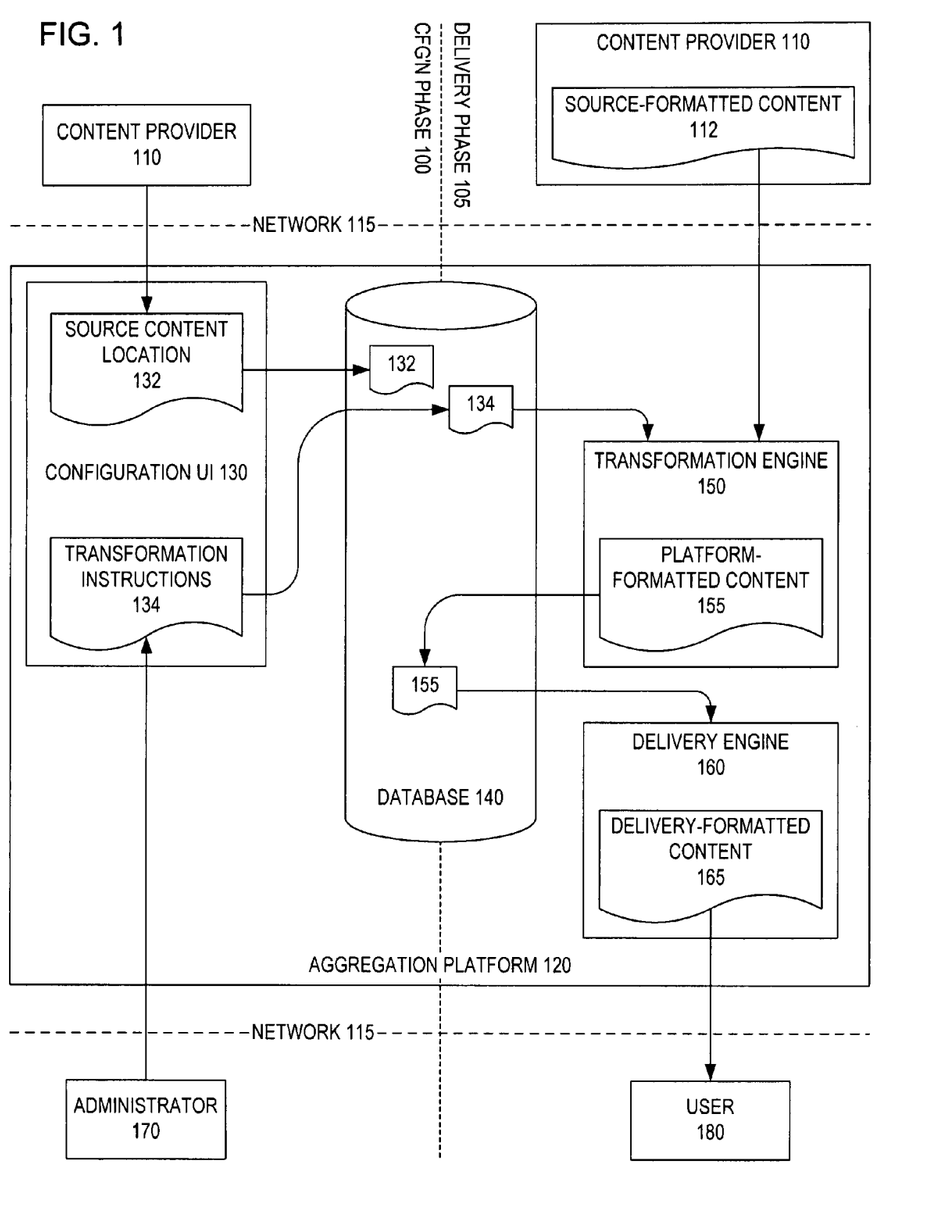
FIG. 1 is a block diagram that depicts a system for managing the distribution of multi-formatted content in accordance with an embodiment of the present invention.
Figure 2:
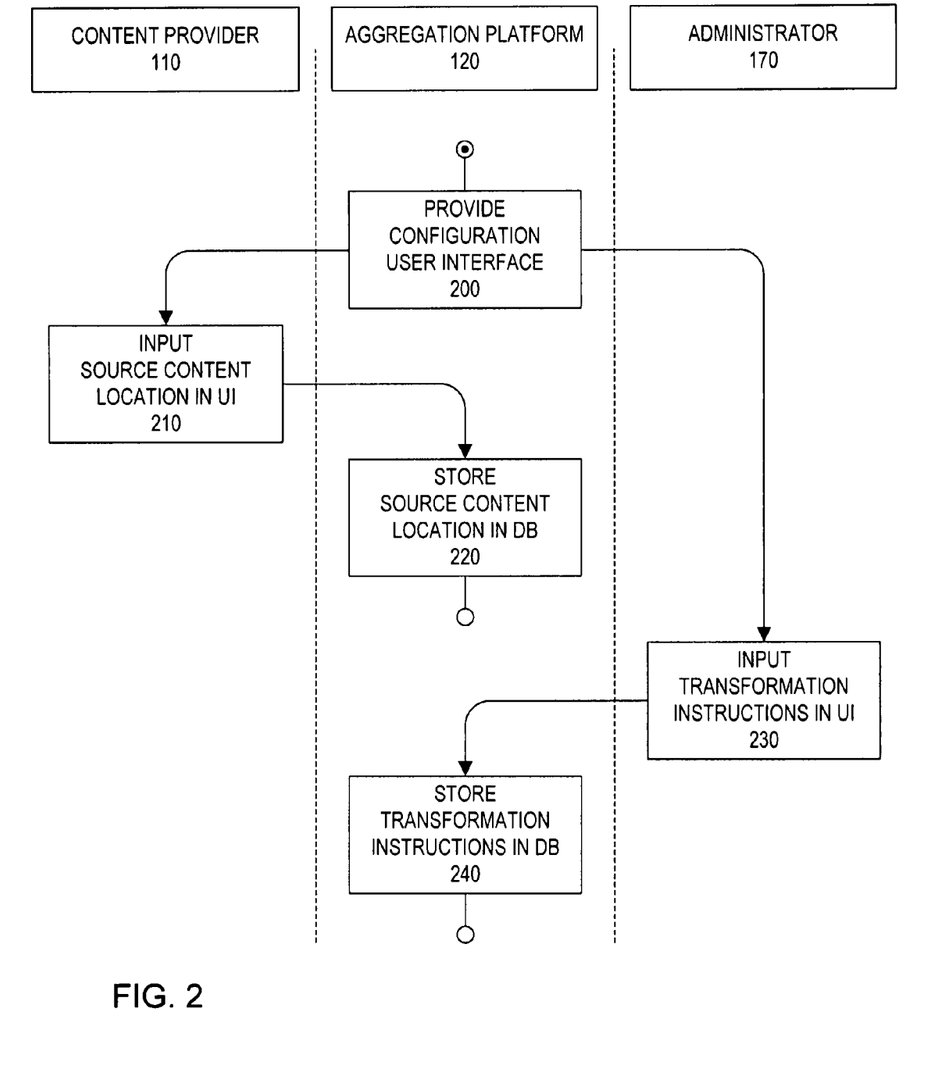
FIG. 2 is a flow chart that depicts a process for configuring content in a content distribution system in accordance with an embodiment of the present invention.

FIG. 1 depicts a content distribution system in accordance with an embodiment of the present invention. The aggregation platform (120) upon which the content distribution system is based includes a configuration user interface (130), database (140), transformation engine (150) and delivery engine (160). FIG. 2 describes a process associated with a configuration phase (100) of the content distribution system, and FIG. 4 describes a process associated with a delivery phase (105) of the system.

In the configuration phase (100), the aggregation platform (120) provides a user interface (step 200) over a network (115) to a content provider (110) and an administrator (170) of the system. The content provider (110) inputs (step 210) into the UI (130) a location of content (132) to be provided to the aggregation platform (120) in the delivery phase (105). To ease the burden of the content provider (110), it need not alter the format of the source content to be delivered to the aggregation platform (120); the delivered content may remain in the source format native to the content provider (110). The platform (120) then stores (step 220) the content location (132) in the database (140) in association with the content provider's profile.

The content location may be expressed as a URL, for example. The source format may include, for example, podcast, RSS, NewsML, sportsML and/or a customized XML format.

In order to enable the aggregation platform (120) to recognize the content provider's source-formatted content (112) so that the platform (120) may process the content for delivery to users, the administrator (170) reviews the source format of the content and inputs (step 230) into the user interface (130) transformation instructions (134) describing how to transform the source format into a platform format native to the aggregation platform (120). The platform (120) then stores (step 240) the transformation instructions (134) in the database (140) in association with the content provider's profile.

Figure 3:
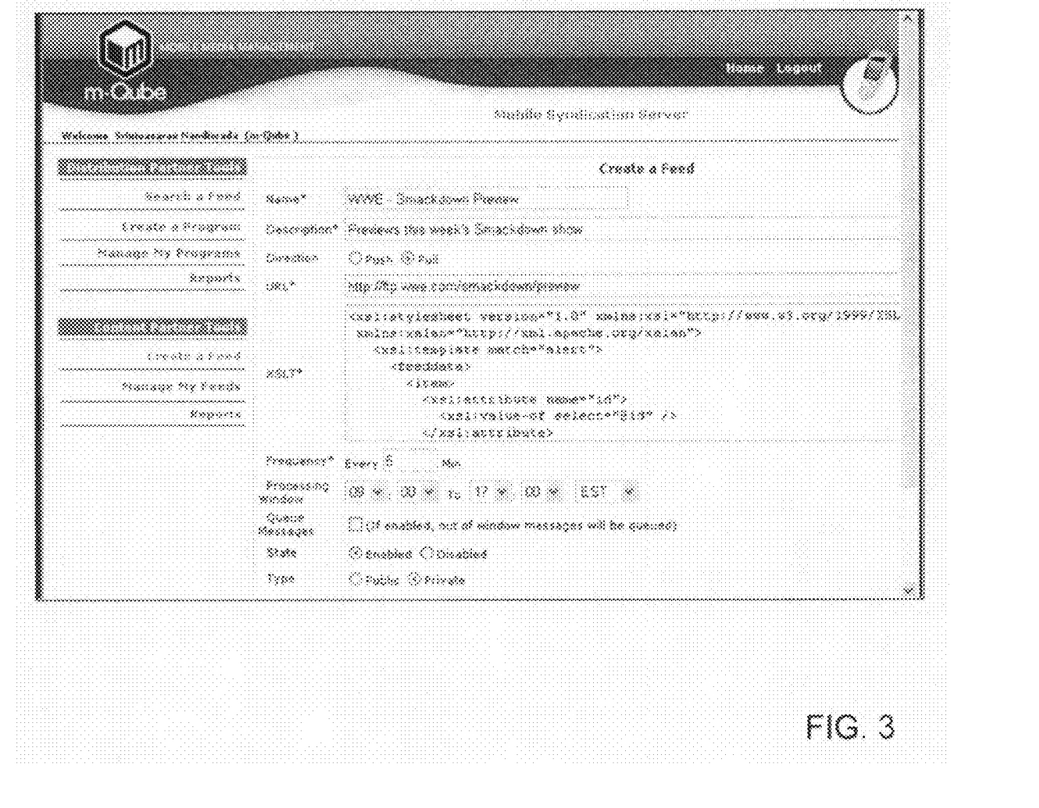
FIG. 3 is a screen shot that depicts a user interface for creating a content feed via a content distribution system in accordance with an embodiment of the present invention.

FIG. 3 depicts a screen shot of a user interface (130) for creating a content feed via a content distribution system in accordance with an embodiment of the present invention. The user interface (130) reflects that the content provider (110) has entered "http://ftp.wwe.com/smackdown/preview" in the URL field to denote the content location (132), and the administrator (170) has entered transformation instructions (134) in the "XSLT" (extensible stylesheet language transformation) field, pertaining to an XML transformation.

Through the use of a such an interface (130), which may be provided as a web interface over the Internet, distribution partners and content partners associated with the content distribution system may establish feeds and programs/subscriptions very quickly and easily. A distribution partner can set up programs using any feeds available on the platform, including feeds that are provided by an unrelated third-party. This capability advantageously enables distribution partners who have an expertise in distribution and marketing, but not necessarily an expertise in or a capability of generating content, to offer a wider range of content in their subscriptions. Similarly, a content partner that generates content but does not want to market and sign up subscribers can obtain a revenue stream from their content by allowing distribution partners to distribute the content using the aggregation platform (120). As described above, the content provider (110) does not have to change the content from its native format. The platform (120) transforms the input and ensures proper compatibility with the end user's device.

Figure 4:
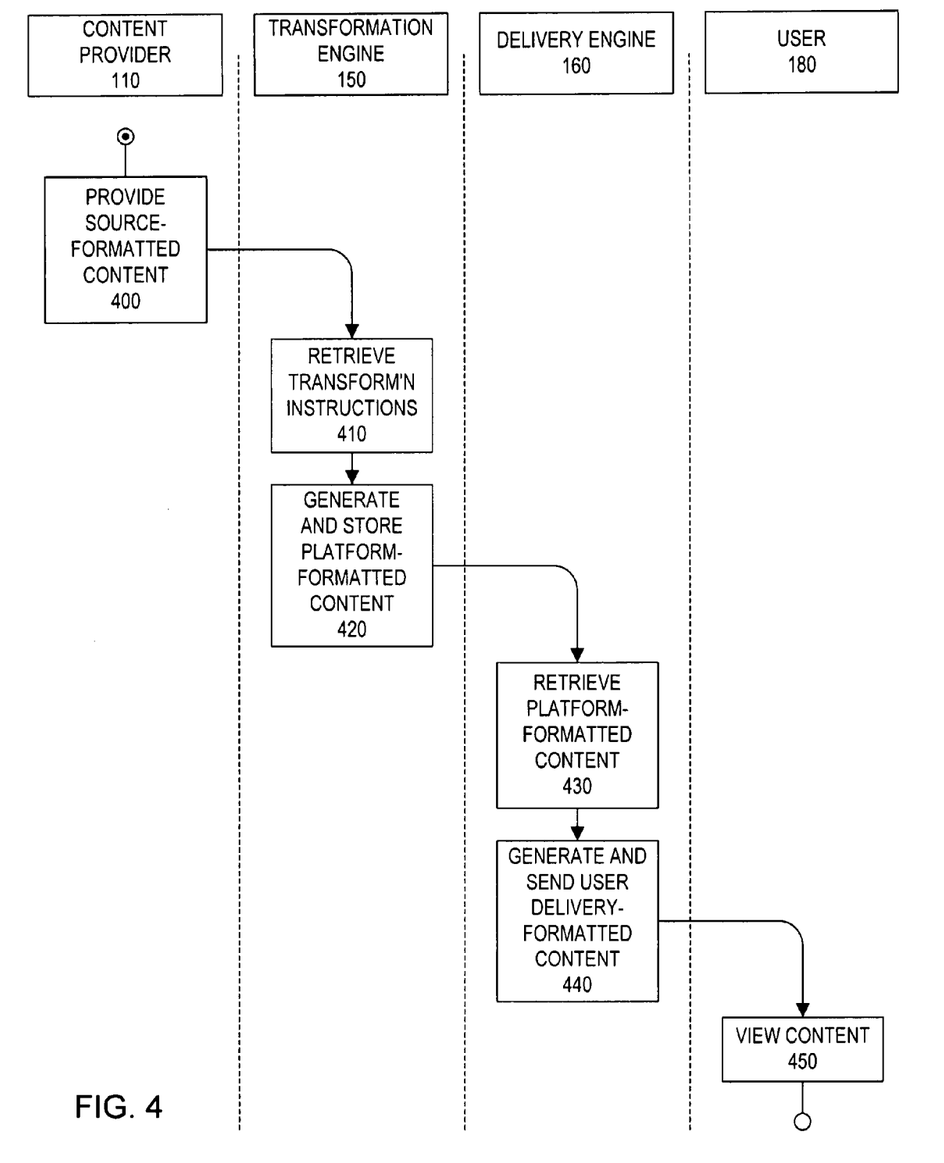
FIG. 4 is a flow chart that depicts a process for delivering content in a content distribution system in accordance with an embodiment of the present invention.

In the delivery phase (105), the content provider (110) provides (step 400) the source-formatted content (112) to the platform (120). The transformation engine (150) receives the source-formatted content (112), and then retrieves (step 410) the transformation instructions (134) associated with this content from the database (140) so that it can transform (step 420) the source format of the content into the platform format in accordance with the retrieved instructions, and store the resulting platform-formatted content (155) in the database (140).

The delivery engine (160) subsequently retrieves (step 430) the platform-formatted content (155) from the database (140), transforms (step 440) the platform format of the platform-formatted content (155) into a delivery format recognizable by display software associated with a user (180), and delivers the delivery-formatted content (165) to the user (180) for display (step 450).

The following example illustrates a transformation of source-formatted content (112) into platform-formatted content (155) in accordance with an embodiment of the present invention. Suppose LISTING 1 represents source-formatted content (112) that is an XML-based RSS feed:

LISTING 1

```
<rss version="2.0">
    <channel>
        <title>The Hindu - Front Page</title>
        <link>http://www.thehindu.com/</link>
        <description>
            The Internet edition of The Hindu, India's national
            newspaper
        </description>
        <language>en-us</language>
        <copyright>Copyright 2006 The Hindu</copyright>
        <pubDate>Fri, 17 Feb 2006</pubDate>
        <image>
            <url>http://www.thehindu.com/thehindu/hindux.gif</url>
            <title>thehindu.com</title>
            <link>http://www.thehindu.com/</link>
            <width>468</width>
            <height>50</height>
        </image>
        <item>
            <category/>
            <link>
            http://www.thehindu.com/2006/02/17/stories/
            2006021708780100.htm
            </link>
            <title>15-point scheme for minorities soon</title>
            <description>
                Ready to address grievances of all political groups
            </description>
            <pubDate>Fri, 17 Feb 2006</pubDate>
        </item>
        <item>
            <category/>
            <link>
            http://www.thehindu.com/2006/02/17/stories/
            2006021715970100.htm
            </link>
            <title>Unpaid allowances for staff to be released</title>
            <description>
                THIRUVANANTHAPURAM: The Cabinet on Thursday
            decided to pay unpaid dearness allowance, house rent
            allowance and city compensatory allowance to about 2,600
            Government employees and aided school teachers who
            were appointed between January 16, 2002 . . .
            </description>
            <pubDate>Fri, 17 Feb 2006</pubDate>
        </item>
    </channel>
</rss>
```

The transformation engine (150) may use the LISTING 2 XSL Transformation on the RSS feed of LISTING 1:

LISTING 2

```
<xsl:stylesheet version="1.0" xmlns:xsl="http://www.w3.org/1999/XSL/
Transform"
xmlns:xalan="http://xml.apache.org/xalan">
    <xsl:template match="rss/channel">
        <feeddata>
            <xsl:for-each select="item">
```

-continued

LISTING 2

```
                <item>
                    <distribution>
                        <target>
                            <xsl:attribute name="cat">
                                <xsl:value-of select="HINDU"/>
                            </xsl:attribute>
                        </target>
                    </distribution>
                    <data>
                        <text>
                            <xsl:value-of select="title"/>
                        </text>
                        <longtext>
                            <xsl:value-of select="description"/>
                        </longtext>
                    </data>
                </item>
            </xsl:for-each>
        </feeddata>
    </xsl:template>
</xsl:stylesheet>
``` to generate the LISTING 3 platform-formatted content (155):

LISTING 3

```
<?xml version="1.0" encoding="UTF-8"?>
<feeddata>
    <item>
        <distribution>
            <target cat="HINDU" />
        </distribution>
        <data>
            <text>15-point scheme for minorities: Kalam</text>
            <longtext>President's Address offers dialogue to
            parties</longtext>
        </data>
    </item>
    <item>
        <distribution>
            <target cat="HINDU" />
        </distribution>
        <data>
            <text>Unpaid allowances for staff to be released</text>
            <longtext>THIRUVANANTHAPURAM: The Cabinet
            on Thursday decided to pay unpaid dearness allowance, house
            rent allowance and city compensatory allowance to about 2,600
            Government employees and aided school teachers who were
            appointed between January 16, 2002 . . . </longtext>
        </data>
    </item>
</feeddata>
```

Figure 5:
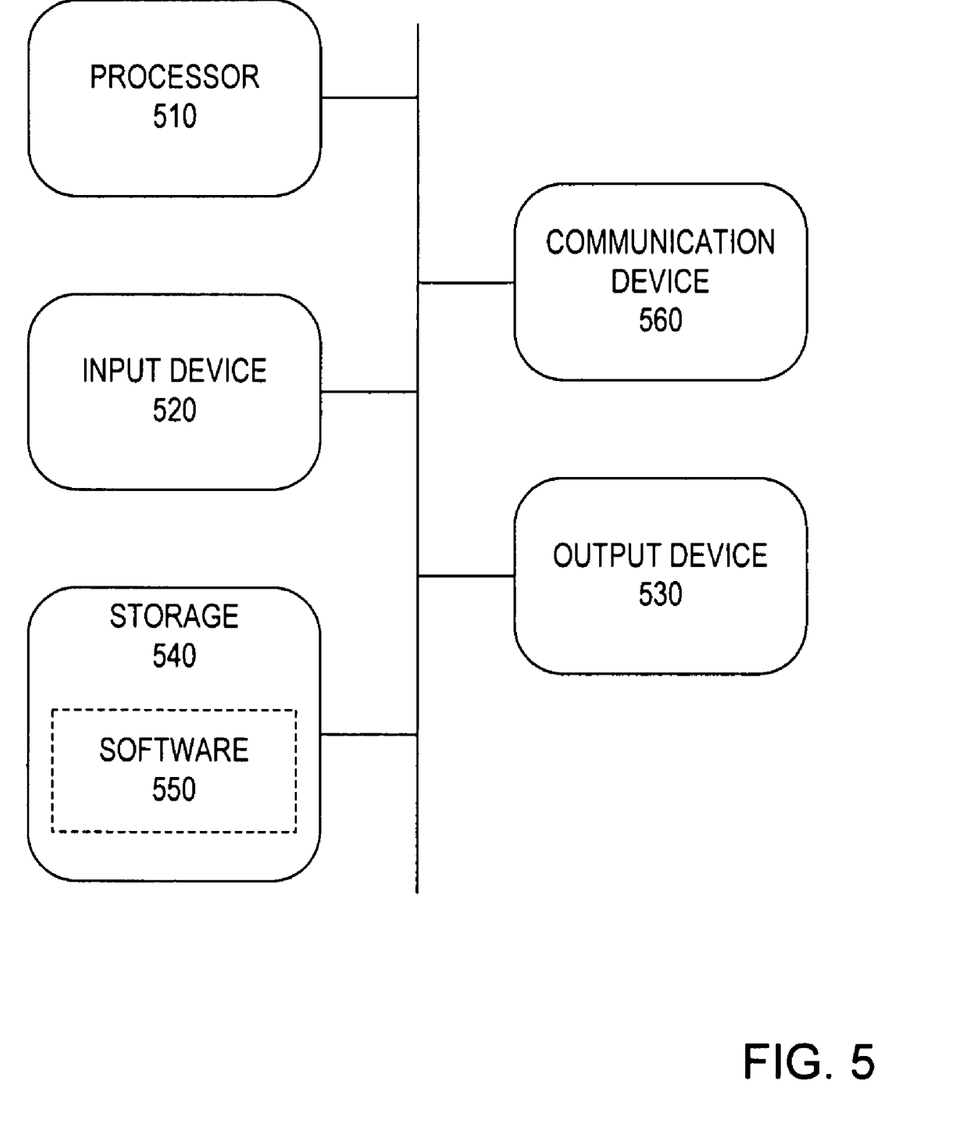
FIG. 5 is a block diagram that depicts a computing device in accordance with an embodiment of the present invention.

FIG. 5 illustrates the components of a basic computing device in accordance with an embodiment of the present invention, which may include a server running the configuration UI (130), transformation engine (150) or delivery engine (160), for example. The computing device may be a personal computer, workstation, server, or any other type of microprocessor-based device. The computing device may include one or more of a processor (510), input device (520), output device (530), storage (540), and communication device (560).

The input device (520) may include a keyboard, mouse, pen-operated touch screen or monitor, voice-recognition device, or any other device that provides input. The output device (530) may include a monitor, printer, disk drive, speakers, or any other device that provides output.

The storage (540) may include volatile and nonvolatile data storage, including one or more electrical, magnetic or optical memories such as a RAM, cache, hard drive, CD-ROM drive, tape drive or removable storage disk. The communication device (560) may include a modem, network interface card, or any other device capable of transmitting and receiving signals over a network. The components of the computing device may be connected in any manner, such as via electrical bus or wirelessly.

The software (550), which may be stored in the storage (540) and executed by the processor (510), may include, for example, the application programming that embodies the functionality of the present invention (e.g., as embodied in the configuration UI (130), transformation engine (150) and delivery engine (160)). The software (550) may include a combination of client applications and enterprise servers such as an application server and a database server.

Communications may occur over any type of network (115), which may implement any communications protocol, and which may be secured by any security protocol. Network links may include telephone lines, DSL, cable networks, T1 or T3 lines, wireless network connections, or any other arrangement that implements the transmission and reception of network signals.

The computing device may implement any operating system, such as Windows, Linux or UNIX. The software (550) may be written in any programming language, such as C, C++, Java, Visual Basic and/or SQL. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention.

For example, software functionality that implements the present invention, such as the configuration UI (130), transformation engine (150) and delivery engine (160), may comprise several discrete modules that together still provide the same functionality, data specified in the illustrated database (140) may be spread over several databases and/or systems, and the data and flow diagrams of FIGS. 2 and 4 may encompass combined steps or several intermediate steps that do not detract from the higher level functionality described therein.

What is claimed is:

1. A method for managing distribution of multi-formatted content, comprising:
   providing, by a content aggregation platform, a user interface to receive a source location of a content feed to be provided to the content aggregation platform by a content provider with the content feed in a source format native to the content provider, and content feed transformation instructions describing how to transform the source format of the content feed into a platform format specific to the content aggregation platform;
   receiving the content feed source location and the content feed transformation instructions via the user interface; and
   storing the content feed source location and the content feed transformation instructions in a database to support subsequent delivery of the content, in a most media-rich format acceptable by a user device, to one or more users for display.

2. The method of claim 1, wherein the source location of the content feed is a URL.

3. The method of claim 1, wherein the content feed transformation instructions describe an XML transformation.

4. The method of claim 3, wherein the XML transformation is an extensible stylesheet language transformation.

5. The method of claim 1, wherein the source format native to the content provider is a podcast format.

6. The method of claim 1, wherein the source format native to the content provider is a RSS format.

7. The method of claim 1, wherein the source format native to the content provider is a NewsML format.

8. The method of claim 1, wherein the source format native to the content provider is a sportsML format.

9. The method of claim 1, wherein the source format native to the content provider is an XML format customized by the content provider.

10. The method of claim 1, wherein the content feed is provided by the content provider.

11. The method of claim 1, wherein the user interface is used by a distribution partner to establish distribution of the content feed to the user device.

12. A method for managing distribution of multi-formatted content, comprising:
    receiving, by a content aggregation platform a content feed from a content provider with the content feed in a source format native to the content provider;
    retrieving content feed transformation instructions describing how to transform the source format of the content feed into a platform format specific to the content aggregation platform;
    transforming the source format of the content feed into the platform format in accordance with the retrieved content feed instructions; and
    storing the platform-formatted content to support subsequent delivery of the content in a user-device-compatible most media-rich format to one or more users for display.

13. The method of claim 12, wherein the content feed transformation instructions are retrieved from a database.

14. The method of claim 12, wherein the transformed content is stored in a database.

15. The method of claim 14, further including
    retrieving the platform-formatted content from the database;
    transforming the platform format of the platform-formatted content into a delivery format recognizable by display software associated with the one or more users; and
    delivering the delivery-formatted content to the one or more users.

16. The method of claim 15, wherein the delivery-formatted content is delivered to mobile devices associated with the one or more users.

17. The method of claim 12, wherein the retrieved transformation instructions describe an XML transformation.

18. The method of claim 17, wherein the XML transformation is an extensible stylesheet language transformation.

19. A system to manage distribution of multi-formatted content, comprising:
    an aggregation platform to receive a content feed from a content provider with the content feed in a source format native to the content provider;
    a transformation engine to retrieve content feed transformation instructions describing how to transform the source format of the content feed into a platform format specific to the content aggregation platform, the transformation engine further to transform the source format of the content feed into the platform format in accordance with the retrieved content feed transformation instructions; and a database to store the platform-formatted content to support subsequent delivery of the content in a user-device-compatible most media-rich format to one or more users for display.

20. The system of claim 19, further comprising the transformation engine to transform the platform-formatted content into a delivery format recognizable by display software associated with the one or more users; and a delivery engine to deliver the delivery-formatted content to the one or more users.

21. The system of claim 19, wherein the retrieved content feed transformation instructions describe an XML transformation.

22. The system of claim 21, wherein the XML transformation is an extensible stylesheet language transformation.

* * * * *